M. T. NESBITT.
Grain Cleaner.

No. 113,686. Patented Apr. 11, 1871.

Witnesses
Wm H Seaman
E. Cate

Moses T. Nesbitt.
By his Atty J. Dennis Jr.

United States Patent Office.

MOSES T. NESBITT, OF COLORA, MARYLAND.

Letters Patent No. 113,686, dated April 11, 1871.

IMPROVEMENT IN MACHINES FOR CLEANING GRAIN.

The Schedule referred to in these Letters Patent and making part of the same.

*To all whom it may concern:*

Be it known that I, MOSES T. NESBITT, of Colora, Cecil county, in the State of Maryland, have invented a new, useful, and improved Machine for Cleaning Grain; and I hereby declare the following to be a full and exact description thereof, reference being had to the accompanying drawing forming part of this specification.

The nature or essence of my invention consists in the particular construction and arrangement of devices forming the improved machine described in the following specification and represented in the accompanying drawing, in which—

In the above-mentioned drawing—

Figure 1:
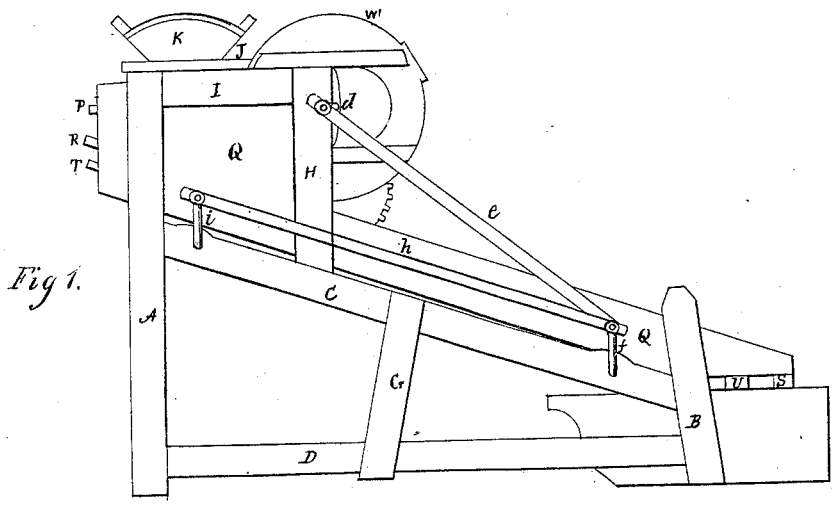
Figure 1 is an elevation of one side of my improved machine.
Figure 2:
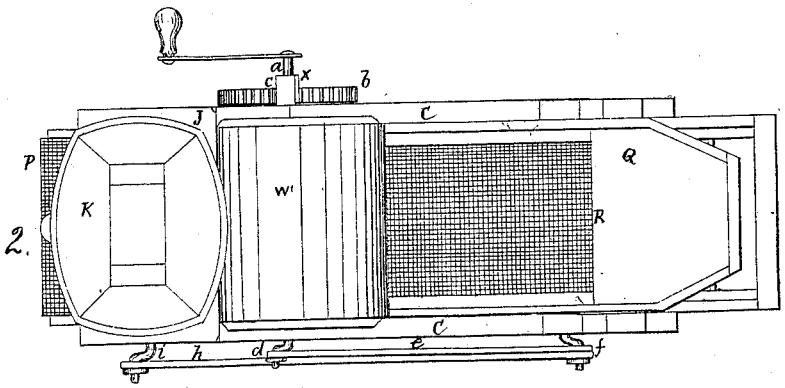
Figure 2 is a plan or top view.
Figure 3:
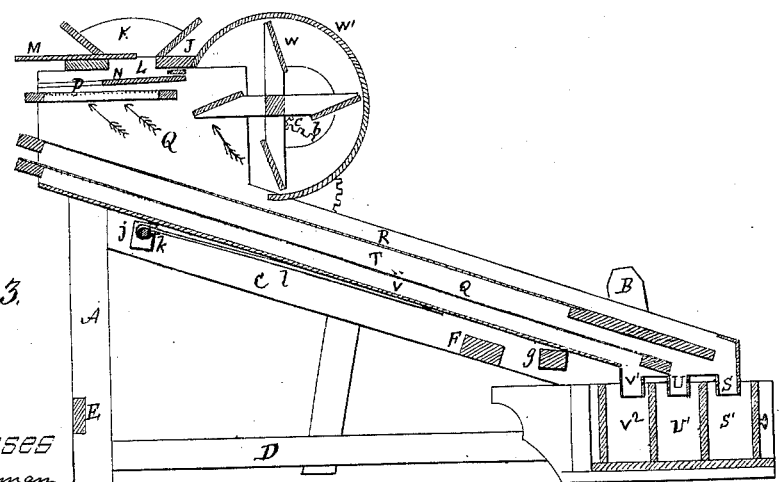
Figure 3 is a section of fig. 2, cut perpendicularly lengthwise.

A A are the front and B B the rear posts, connected by the bars C and D and by the cross-bars E and F, forming a strong frame, as shown in the drawing, to which the other parts of the machine are either fastened or connected; and the bars C and D are connected by the braces G G.

The posts H are framed into the bars C, and are connected to the posts A by bars I; and across the bars I the top board J is fastened, which holds the top of the two side frames firmly together.

This board J has the hopper K upon it, with an opening, L, through the board J, which may be closed or graduated by the slide M to regulate the supply of grain passing through the opening L onto the spreading-board N, which delivers it to the first riddle P in the shoe Q, which riddle P takes out the straw and refuse matter too large to pass through it, which pass off of the riddle out of the machine, while the grain passes through the riddle onto the screen R, which retains all the good full grains of wheat, which pass down the screen and through the spout S into the trough or box S', from which it may be bagged for market, while the small, light, imperfect grains of wheat and oats with the seeds of weeds pass through the screen R onto the screen T below it, provided with meshes so fine as to retain the wheat or other grain which passes over it into the spout U and box U', which retains it until it is removed, while the seeds of weeds pass through the screen T onto the bottom board V of the shoe, which conducts the seeds to the spout V¹, through which they fall into the box V², thus separating the good grain from the poor and the poor grain from the seeds of weeds, and at the same time saving them all for future use.

In order to blow the chaff and dust from the grain as they descend from the hopper to the riddle, and from the riddle to the screens, I arrange the fan W to turn in journal-boxes fastened to the posts H, and build a case, W', around it, as shown in the drawing, with openings at the ends to admit the air, which is blown over and under the riddle P, carrying the chaff and dirt out of the machine and separating it from the grain.

I fasten the yoke X to the post H to support the crank-shaft $a$, which turns the gear $b$ to drive the pinion $c$ and turn the fan W.

On the opposite end of the fan-shaft from the pinion $c$ there is a crank, $d$, with a pitman, $e$, to the crank $f$ on the rock-shaft $g$, which is provided with bearings in the bars C, and extends across the frame under the shoe Q, to support it, and the upper side of the shaft $g$ is made flat and wide, so that as the shaft is rocked by the vibration of the crank the shoe is alternately lifted and let down with a jolt or jounce to shake the grain on the screens as it descends, and shake the seeds of weeds through the screens.

There is a connecting-rod, $h$, from the crank $d$ to the crank $i$ on the shaft $j$, which supports the upper end of the shoe Q and jolts it the same as the shaft $g$.

The shaft $j$ has a crank, $k$, in the middle, with a spring, $l$, fastened to the under side of the shoe Q to traverse it each way as it is jolted by the crank-shafts.

My machine has a great advantage over machines heretofore in use, as the fan is made smaller and arranged above the principal screws, so as to blow a strong blast under the first riddle with but little power; and also in lengthening the screens and giving them a jolting and traversing motion, so as to most effectually screen the grain and separate the different qualities by screening.

Having described my improvements,

I claim—

The arrangement of two rock-shafts, $g$ and $j$, the screens R and T, the rock-shaft $j$ being provided with a crank or wrist, $k$, and spring-connection $l$, to traverse the screens, provided with delivering-spouts U and S, the whole being constructed to operate as described for the purposes set forth.

MOSES T. NESBITT.

Witnesses:
J. W. ABRAHAMS,
R. K. MORTON.